US011842550B2

(12) United States Patent
Kang et al.

(10) Patent No.: US 11,842,550 B2
(45) Date of Patent: Dec. 12, 2023

(54) SMART DRIVING POSTURE CONTROL SYSTEM AND METHOD

(71) Applicants: HYUNDAI MOTOR COMPANY, Seoul (KR); KIA CORPORATION, Seoul (KR)

(72) Inventors: Seong Gyu Kang, Suwon-si (KR); Hyung Kee Kim, Suwon-si (KR); Byeong Yeon Hwang, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 79 days.

(21) Appl. No.: 17/464,065

(22) Filed: Sep. 1, 2021

(65) Prior Publication Data
US 2022/0101027 A1 Mar. 31, 2022

(30) Foreign Application Priority Data
Sep. 28, 2020 (KR) .................. 10-2020-0126262

(51) Int. Cl.
*G06V 20/59* (2022.01)
*B60R 16/037* (2006.01)
*G06V 40/10* (2022.01)
*G06V 40/16* (2022.01)

(52) U.S. Cl.
CPC .......... *G06V 20/597* (2022.01); *B60R 16/037* (2013.01); *G06V 40/103* (2022.01); *G06V 40/171* (2022.01)

(58) Field of Classification Search
CPC .. G06V 20/597; G06V 40/103; G06V 40/171; G06V 10/766; B60R 16/037; B60R 11/04; B60W 50/08; B60W 40/08; B60W 2040/0872; B60W 2040/0881; B60W 2050/0005; B60W 2420/42
See application file for complete search history.

(56) References Cited

U.S. PATENT DOCUMENTS

| | | | |
|---|---|---|---|
| 8,682,537 B2 | 3/2014 | Kang et al. | |
| 2009/0066065 A1* | 3/2009 | Breed | B60R 21/0152 340/573.1 |
| 2009/0088930 A1* | 4/2009 | Ohtsubo | B60N 3/063 297/316 |
| 2013/0069402 A1* | 3/2013 | Kang | B60N 2/02246 297/217.2 |
| 2016/0159251 A1* | 6/2016 | Ebina | B60N 2/002 701/49 |

(Continued)

FOREIGN PATENT DOCUMENTS

KR 10-1371975 B 3/2014

*Primary Examiner* — Md K Talukder
(74) *Attorney, Agent, or Firm* — LEMPIA SUMMERFIELD KATZ LLC

(57) ABSTRACT

A smart driving posture control system includes: an image sensor installed in a vehicle, a memory for storing instructions, and a processor connected to the image sensor and the memory. The processor recognizes a user boarding the vehicle through the image sensor to extract human body feature information of the user, extracts recommended posture information based on the extracted human body feature information, and controls a convenience device based on the recommended posture information to adjust a driving posture of the user.

20 Claims, 7 Drawing Sheets

(56) References Cited

U.S. PATENT DOCUMENTS

| | | | | |
|---|---|---|---|---|
| 2018/0257658 A1* | 9/2018 | Cho | ................... | B60W 40/08 |
| 2019/0038204 A1* | 2/2019 | Beck | ................... | A61B 5/024 |
| 2019/0047588 A1* | 2/2019 | Yabuuchi | ........... | B60W 60/0053 |
| 2020/0070840 A1* | 3/2020 | Gunaratne | ............ | B60K 28/06 |
| 2020/0207358 A1* | 7/2020 | Katz | ................. | G01C 21/3697 |
| 2020/0383610 A1* | 12/2020 | Abe | ...................... | G06T 17/00 |
| 2021/0188289 A1* | 6/2021 | Oba | ................... | B60W 60/005 |
| 2021/0331605 A1* | 10/2021 | Lee | ................... | B60N 2/0228 |
| 2022/0101027 A1* | 3/2022 | Kang | ................. | G06V 20/597 |

\* cited by examiner

|  | Physique [3~.9 Clustering] | | | | | Health Posture | | | Road Type | | Traffic Condition | | Vehicle Type | | | | Constraint | OUTPUT | RFRNC |
|---|---|---|---|---|---|---|---|---|---|---|---|---|---|---|---|---|---|---|---|
|  | Sex | Age | Weight [Kg] | Stature [Cm] | Sitting Height [Cm] | Seat Back Angle | Seat Cusion Angle | Lumbar Support | High Way | State Road | Good | Bad | Small | Middle | Large | RV/SUV | Amount Used/Height Position | Device All | Total Case |
| DB [SMPL] | ... | ... | ... | ... | ... | ... | ... | MIN/MAX | 0/1 | 0/1 | 0/1 | 0/1 | 0/1 | 0/1 | 0/1 | 0/1 | A/U ≥ 10 /Limited Height | ... | 240~432 Case |
| Input 1 | F | 26 | 48 | 162 |  | 24 | 3 | MIN | 0/1 | 0/1 | 0/1 | 0/1 | 0/1 | 0/1 | 0/1 | 0/1 |  | ... | ... |
| Input 2 | F | 48 | 57 | 153 | 72 | 23 | 3.5 | MAX | 0/1 | 0/1 | 0/1 | 0/1 | 0/1 | 0/1 | 0/1 | 0/1 |  | ... | ... |
| Input 3 | M | 35 | 78 | 186 | 97 | 25 | 4 | MAX | 0/1 | 0/1 | 0/1 | 0/1 | 0/1 | 0/1 | 0/1 | 0/1 |  | ... | ... |

310

| data set no. | Slide(5mm) | Driver Seat Height(5단위) | | seat_back | STRG/WHL | | O/S Mirror | | | |
|---|---|---|---|---|---|---|---|---|---|---|
|  |  | FRT | RR |  | Tilt | Tele | L/R(LH) | U/D(LH) | L/R(RH) | U/D(RH) |
| 1 | 170 | 25 | 25 | 41 | 5 | 15 | -1 | 0 | 1 | 0 |
| 2 | 170 | 25 | 25 | 41 | 5 | 15 | -1 | 0 | 1 | 0 |

320

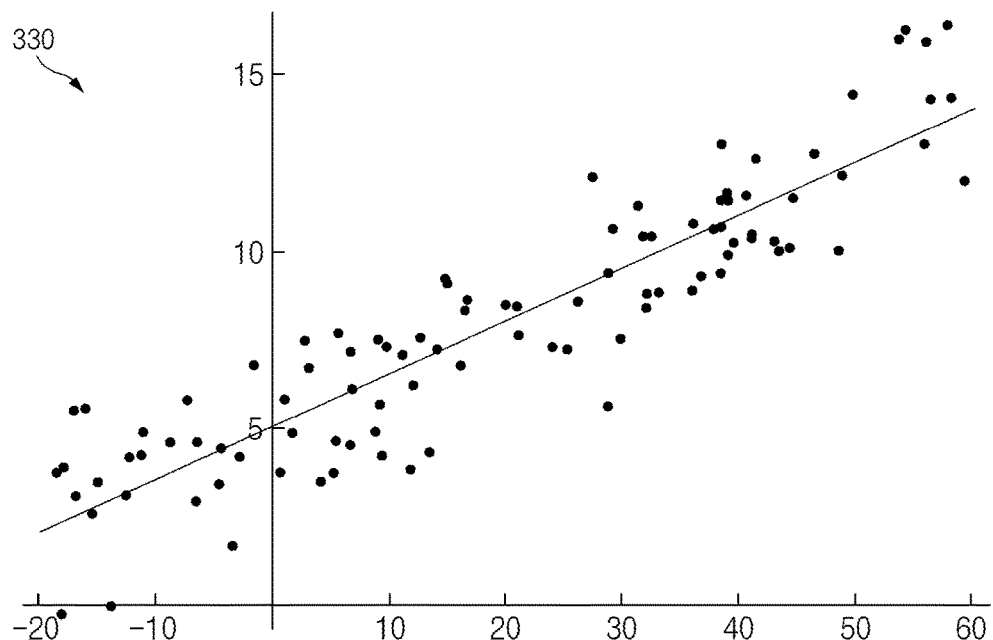

SMART DRIVING POSTURE CONTROL SYSTEM AND METHOD

CROSS-REFERENCE TO RELATED APPLICATION

This application claims priority to and the benefit of Korean Patent Application No. 10-2020-0126262, filed on Sep. 28, 2020, the entire contents of which are incorporated herein by reference.

FIELD

The present disclosure relates to smart driving posture control system and method.

BACKGROUND

The statements in this section merely provide background information related to the present disclosure and may not constitute prior art.

A vehicle is equipped with convenience devices for providing convenience to a driver. For example, a smart posture control system, a driving posture memory system (an integrated memory system, IMS), a parking assist system, a heating wire system, and/or a smart trunk system are being applied to the vehicle. Among those, the smart posture control system automatically adjusts positions of a seat, a mirror, a steering wheel, and a head-up display (HUD) based on body information input by the driver to recommend a driving posture. When the position is not a position desired by a user, the position is adjusted with a manual button, and the adjusted position is updated a new recommended driving position based on whether the adjusted position is a recommended driving position within the driving posture allowable management area acquired from the server.

SUMMARY

An aspect of the present disclosure provides a smart driving posture control system and a method that extract human body feature information from a user image acquired by an image sensor, and detect body information of a user based on the extracted human body feature information to recommend a driving posture that fits a body type of the user using a statistical prediction model such as a polynomial regression model.

Another aspect of the present disclosure provides a smart driving posture control system and a method that, when the recommended driving posture is changed through arbitrary adjustment of the user or the like, store the changed driving posture together with the corresponding human body feature information and body information to be updated as a new statistical prediction model.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a smart driving posture control system includes: an image sensor installed in a vehicle, a non-transitory memory for storing instructions executable to process a driving posture control, and a processor connected to the image sensor and the memory, wherein the processor recognizes a user boarding the vehicle through the image sensor to extract human body feature information of the user, extracts recommended posture information based on the extracted human body feature information, and controls a convenience device based on the recommended posture information to adjust a driving posture of the user.

In one implementation, the processor may analyze the human body feature information to estimate body information of the user, and extract the recommended posture information matching the estimated body information using a statistical prediction model stored in the memory.

In one implementation, the processor may, when the user uses a smart driving posture control function for the first time, receive body information input by the user, extract the recommended posture information based on the body information, and control the convenience device based on the recommended posture information to adjust the driving posture.

In one implementation, the body information may include at least one of a sex, an age, a height, a weight, and/or a leg length of the user.

In one implementation, the processor may store adjusted driving posture information in the memory when the user is satisfied with the adjusted driving posture.

In one implementation, the processor may extract the human body feature information of the user using the image sensor and store the extracted human body feature information together with the driving posture information and body information of the user.

In one implementation, the processor may, when the user is dissatisfied with the adjusted driving posture, control the convenience device based on arbitrary adjustment of the user to adjust the driving posture, and store the adjusted driving posture together with the human body feature information and body information of the user.

In one implementation, the human body feature information may include at least one of appearance information and/or position information of each body part of the user.

In one implementation, the appearance information may include at least one of a wrinkle, a skin color, an eye size, a face size, and a body shape, and the position information of each body part may include an absolute coordinate of each body part and/or a relative coordinate between body parts of the user.

In one implementation, the convenience device may include at least one of a seat device, a steering wheel device, a mirror device, and/or a HUD device.

According to another aspect of the present disclosure, a smart driving posture control method includes recognizing a user boarding a vehicle through an image sensor to extract human body feature information of the user, extracting recommended posture information based on the extracted human body feature information, and controlling a convenience device based on the recommended posture information to adjust a driving posture.

In one implementation, the extracting of the recommended posture information may include analyzing the human body feature information to estimate body information of the user, and extracting the recommended posture information matching the estimated body information using a statistical prediction model stored in a memory.

In one implementation, the method may further include receiving body information input by the user when the user uses a smart driving posture control function for the first time, and extracting the recommended posture information based on the body information.

In one implementation, the body information may include at least one of a sex, an age, a height, a weight, and/or a leg length of the user, and the leg length may include all statistics obtained by calculating a length of an inseam of pants or a numeric value selected by the user in relation to the height.

In one implementation, the method may further include storing adjusted driving posture information in a memory when the user is satisfied with the adjusted driving posture.

In one implementation, the method may further include extracting the human body feature information of the user using the image sensor and storing the extracted human body feature information together with the driving posture information and body information.

In one implementation, the method may further include, when the user is dissatisfied with the adjusted driving posture, controlling the convenience device based on arbitrary adjustment of the user to adjust the driving posture, and storing the adjusted driving posture together with the human body feature information and body information.

In one implementation, the human body feature information may include at least one of appearance information and/or position information of each body part.

In one implementation, the appearance information may include at least one of a wrinkle, a skin color, an eye size, a face size, and a body shape, and the position information of each body part may include an absolute coordinate of each body part and/or a relative coordinate between body parts.

In one implementation, the convenience device may include at least one of a seat device, a steering wheel device, a mirror device, and/or a HUD device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 3 is a diagram for illustrating a process of realizing a polynomial regression model according to exemplary forms of the present disclosure;

Figure 1:
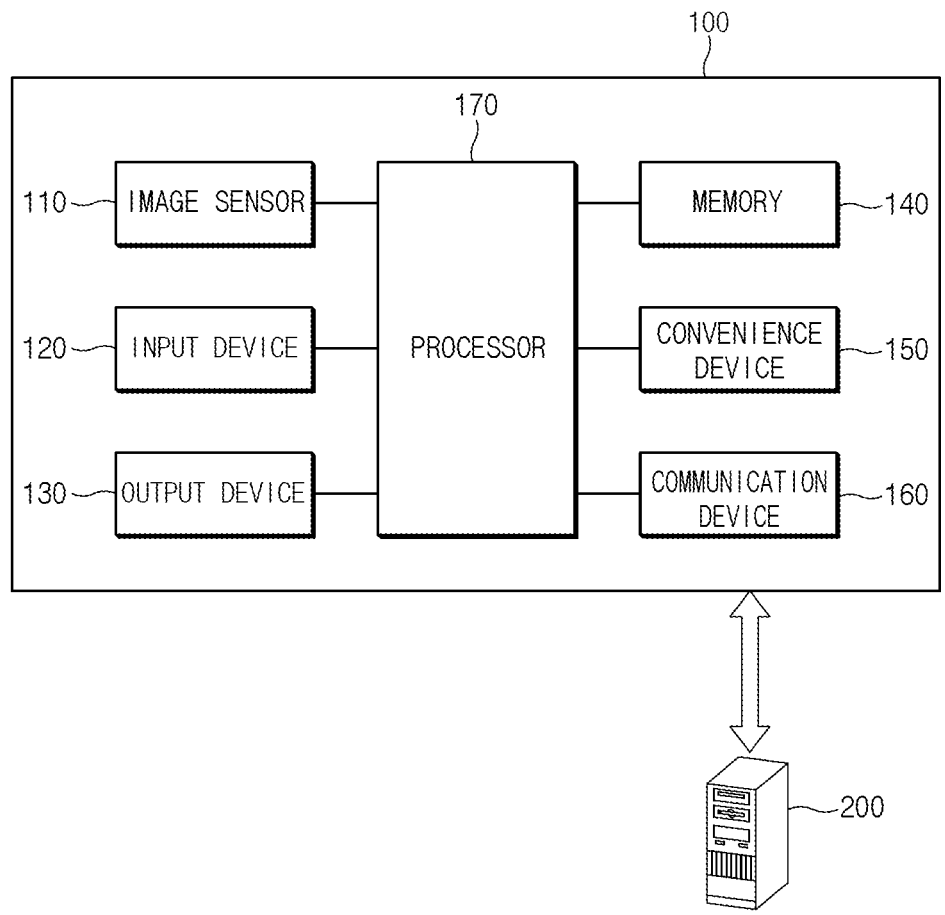
FIG. 1 illustrates a block diagram of a smart driving posture control system according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of the related known configuration or function will be omitted when it is determined that it interferes with the understanding of the form of the present disclosure.

In describing the components of the form according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
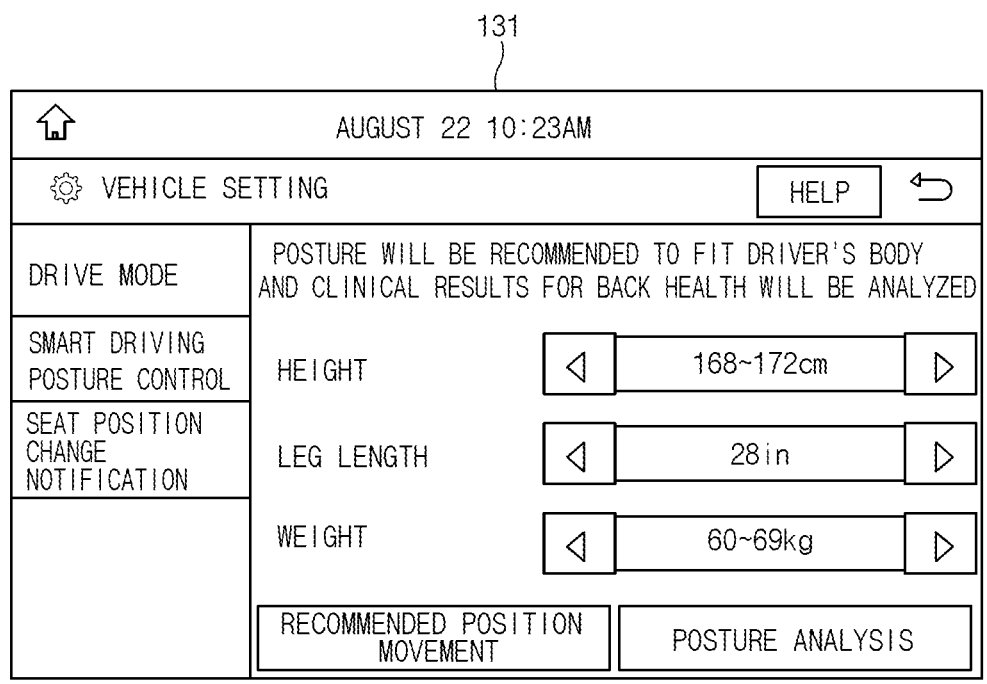
FIG. 2 is an exemplary view illustrating a body information input screen according to some forms of the present disclosure.

FIG. 1 illustrates a block diagram of a smart driving posture control system according to some forms of the present disclosure. FIG. 2 is an exemplary view illustrating a body information input screen according to some forms of the present disclosure.

A smart driving posture control system 100 may include an image sensor 110, an input device 120, an output device 130, a memory 140, a convenience device 150, a communication device 160, and a processor 170, which are mounted on a vehicle and connected through a vehicle network. The vehicle network may be implemented as a controller area network (CAN), a media oriented systems transport (MOST) network, a local interconnect network (LIN), an ethernet, and/or a flexray.

The image sensor 110 may be installed at at least one position in the vehicle to take an image. For example, the image sensor 110 may be installed at a position in front of each seat in the vehicle to take an image of a user seated in the corresponding seat. The image sensor 110 may include at least one of a charge coupled device (CCD) image sensor, a complementary metal oxide semi-conductor (CMOS) image sensor, a charge priming device (CPD) image sensor, and/or a charge injection device (CID) image sensor. The image sensor 110 may include a memory for storing the acquired image, and an image processor for performing image processing such as noise removal, color reproduction, file compression, image quality adjustment, and/or saturation adjustment on the acquired image.

The input device 120 generates data resulted from a manipulation of the user, which may be implemented as a keyboard, a keypad, a button, a switch, a touch pad, and/or a touch screen. The input device 120 may be disposed on a steering wheel, a dashboard, a center fascia, and/or a door trim.

The output device 130 is for outputting information, which may include at least one of a liquid crystal display (LCD), a thin film transistor-liquid crystal display (TFT-LCD), an organic light-emitting diode (OLED) display, a flexible display, a 3-dimensional display (3D display), a transparent display, a head-up display (HUD), a touch screen, and/or a cluster.

The input device 120 and the output device 130 described above may be collectively referred to as a human interface device (HID).

The memory 140 may be a non-transitory storage medium that stores instructions executed by a processor. The memory 140 may be implemented as at least one of storage media (recording media) such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, a web storage, and the like.

The memory 140 may store a general-purpose artificial intelligence inference engine and a personalized artificial intelligence inference engine. The general-purpose artificial intelligence inference engine is a polynomial regression model (a polynomial regression equation) built on the basis of body information of unspecified individuals and convenience device position information. The personalized artificial intelligence inference engine is a polynomial regression model built on the basis of body information of each individual and the convenience device position information, which may be updated by a server 200. The memory 140 may store an inference result by the general-purpose artificial intelligence inference engine and an inference result by the personalized artificial intelligence inference engine.

The convenience device 150 is a device that provides convenience to the user boarded the vehicle and affects a driving posture of the user, which may adjust a position of a control target (e.g., the seat, the steering wheel, a mirror, and the like) using a motor. The convenience device 150 may include at least one of a seat device, a steering wheel device, a mirror device, a HUD device, and/or a lumbar support device. The seat device may adjust the seat position, for example, a slide position (or a horizontal position), a tilt and a vertical height of a seat cushion, and/or a seatback angle. The steering wheel device may adjust a fore and aft position (or a slide position) and/or a tilt angle of the steering wheel. The mirror device may adjust an angle of the mirror. The HUD device may adjust a projection angle of the HUD, and the lumber support device (or waist support device) may adjust a lumber support position and a lumber support strength.

The communication device 160 may support communication with the external server 200. The communication device 160 may include a communication processor, a communication circuit, an antenna, and/or a transceiver. The communication device 160 may use wireless Internet technologies such as a wireless LAN (WLAN) (Wi-Fi), a wireless broadband (Wibro), and/or a world interoperability for microwave access (Wimax), short-range communication technologies such as a Bluetooth, a near field communication (NFC), a radio frequency identification (RFID), an infrared data association (IrDA), an ultra wideband (UWB), and/or a ZigBee, and/or mobile communication technologies such as a code division multiple access (CDMA), a global system for mobile communication (GSM), a long term evolution (LTE), an LTE-Advanced, and/or international mobile telecommunication (IMT)-2020.

The processor 170 may control overall operations of the smart driving posture control system 100. The processor 170 may be implemented as at least one of an application specific integrated circuit (ASIC), a digital signal processor (DSP), a programmable logic device (PLD), a field programmable gate array (FPGA), a central processing unit (CPU), a microcontroller, and/or a microprocessor.

First, an operation of the processor 170 of when the user uses a smart driving posture function for the first time will be described.

The processor 170 may activate a smart driving posture setting mode when a preset specific event occurs. The processor 170 may activate the smart driving posture setting mode when a button to which a smart driving posture setting function is assigned in the input device 120 is manipulated by the user. In addition, when a smart driving posture setting reset request is received from the input device 120, the processor 170 may activate the driving posture setting mode.

The processor 170 may receive body information of the user from the input device 120 after activating the smart driving posture setting mode. The body information may include at least one of a height, a leg length, a weight, a sex, and/or an age of the user. In this connection, a length of an inseam of pants may be applied as the leg length. In addition, the leg length may include all statistics obtained by calculating a numeric value selected by the user in relation to the height. For example, when activating the smart driving posture setting mode, as illustrated in FIG. 2, the processor 170 may output a body information input screen 131 on the output device 130. The user may input the body information using the input device 120, and the processor 170 may receive the body information input by the user from the input device 120. When the user inputs the body information for the first time, the processor 170 may provide user identification information (e.g., an ID) matching the input body information.

The processor 170 may extract recommended posture information based on the input body information. The processor 170 may estimate the recommended posture information matching the body information input by the user using the general-purpose artificial intelligence inference engine. The recommended posture information may include information such as the seat position, the steering wheel position, the mirror position, and/or the HUD position.

The processor 170 may control the convenience device 150 based on the extracted recommended posture information to adjust the driving posture of the user. The processor 170 may transmit the recommended posture information to the convenience device 150. The convenience device 150 may adjust the position of the control target, such as the seat, the steering wheel, the mirror, and/or the HUD, based on the recommended posture information.

The processor 170 may determine whether the user is satisfied with the adjusted driving posture. The processor 170 may output a message inquiring whether the user is satisfied with the driving posture on the output device 130, and receive a response thereto from the input device 120. The processor 170 may determine satisfaction or dissatisfaction with the driving posture based on the response received from the input device 120. Alternatively, when the user arbitrarily adjusts the driving posture after the driving posture is adjusted, the processor 170 may determine that the user is dissatisfied with the adjusted driving posture.

When the user is dissatisfied with the adjusted driving posture, the processor 170 may detect information (e.g., the position information of the seat, the steering wheel, the mirror, and/or the HUD) on the driving posture arbitrarily adjusted by the user. The processor 170 may determine whether the driving posture information is within a tolerance range of the recommended posture and whether the driving posture of the user based on the driving posture information has a safety problem. When the driving posture information is within the tolerance range of the recommended posture or the driving posture of the user does not have the safety problem, the processor 170 may store the corresponding driving posture information in the memory 140 together with the body information. In this connection, the processor 170 may acquire the user image using the image sensor 110 and extract human body feature information from the user image through image analysis. The human body feature information may include at least one of appearance information and/or position information of each body part. The appearance information may include at least one of a wrinkle, a skin color, an eye size, a face size, a nose size, and/or a body shape. The position information of each body part may include 3-dimensional coordinate information (an absolute coordinate) and distance correlation information (a relative coordinate) between body parts for at least one of both eyes, a nose, a mouth, both earlobe, and/or both shoulders. The processor 170 may store the body information of the user, current driving posture information, and the human body feature information in the memory 140 in conjunction with the user identification information.

When the user is satisfied with the adjusted driving posture, the processor 170 may store the adjusted driving posture information (the current driving posture information) in the memory 140. The processor 170 may acquire the user image using the image sensor 110, and extract the human body feature information from the acquired user image. The processor 170 may store the body information, the current driving posture information, and the human body feature information of the user in the memory 140 in conjunction with the user identification information. When the user re-boards the same vehicle or boards another type of vehicle in the future, the current driving posture information may be used as another input information for further verifying user recognition accuracy.

When the processor 170 stores the body information, the driving posture information, and the human body feature information of the user in the memory 140, the processor 170 may transmit the corresponding information to the server 200 using the communication device 160. The server 200 may collect (acquire) information (data) transmitted from the vehicle and classify and analyze the collected information to generate the personalized artificial intelligence inference engine. In other words, the server 200 may generate a statistical prediction model such as the polynomial regression equation like [Equation 1] expressing features of the collected information.

$$y=\alpha+\beta_0 x_0+\beta_1 x_1^2+\ldots+\beta_k x_k^n+\varepsilon \qquad \text{[Equation 1]}$$

In this connection, $x_0, x_1, \ldots, x_k$ are the body information, which may be the height, the weight, the leg length, and the like. $\alpha$, $\beta$, and $\varepsilon$ are weighted values, which have constant values.

The server 200 may transmit the generated polynomial regression equation to the vehicle. The processor 170 of the smart driving posture control system 100 in the vehicle may receive the polynomial regression equation through the communication device 160 and update the polynomial regression equation stored in advance in the memory 140.

Next, an operation of the processor 170 of when the user reuses the smart driving posture function will be described.

The processor 170 may extract the human body feature information of the user using the image sensor 110 when the user boards the vehicle. The processor 170 may estimate (detect) the body information of the user based on the extracted human body feature information. The processor 170 may extract the recommended posture information matching the estimated body information using the personalized artificial intelligence inference engine (the polynomial regression equation) stored in the memory 140. The processor 170 may control the driving posture by adjusting the convenience device 150 based on the extracted recommended posture information.

When the driving posture control is completed by the convenience device 150, the processor 170 may determine whether the user is satisfied with a current driving posture. After controlling the driving posture, the processor 170 may determine that the user is dissatisfied with the driving posture control when the driving posture is arbitrarily adjusted by the user.

When the user is satisfied with the driving posture control, the processor 170 may store the current driving posture information in the memory 140. In addition, the processor 170 may extract the human body feature information of the user through the image sensor 110, and store the extracted human body feature information in the memory 140 together with the current driving posture information. In addition, the processor 170 may transmit the driving posture information and the human body feature information to the server 200. The server 200 may analyze the received driving posture information and human body feature information, and reflect the analysis result to generate the personalized artificial intelligence inference engine, that is, the equation of [Equation 1]. The server 200 may update the polynomial regression equation stored in the memory 140 of the smart driving posture control system 100 with the generated equation. Although not shown in the drawing, the server 200 may include a communication device, storage, and a processor. The storage may store driving posture information based on body conditions (heights, weights, leg lengths, and the like) clustered for each region and/or each sex. The processor may generate the prediction model (the polynomial regression model) using numerical data such as the age, the height, the weight, the leg length, and the like.

FIG. 3 is a diagram for illustrating a process of realizing a polynomial regression model according to forms of the present disclosure.

Referring to FIG. 3, the server 200 may acquire, from the vehicle, the body information (e.g., the sex, the age, the weight, the height, the leg length, and the like) of the user, a seat position (e.g. the seatback angle, a cushion angle, and the lumber support strength), a road type (e.g., a highway, a national road, and the like), a traffic condition, a vehicle type, and/or a restriction condition as input data 310. In addition, the server 200 may acquire the seat position (the vertical height, the slide position and the tilt of the seat cushion, the seatback angle, and the like), steering position information (a tilt and a telescopic), and the mirror position information (the angle) as output data 320. The server 200 may analyze data distribution of the input data 310 and the output data 320. When a data analysis result represents a linear relationship as in a graph 330, the server 200 may represent such linear relationship as the statistical prediction model such as a polynomial expression or the polynomial regression equation.

Figure 4:
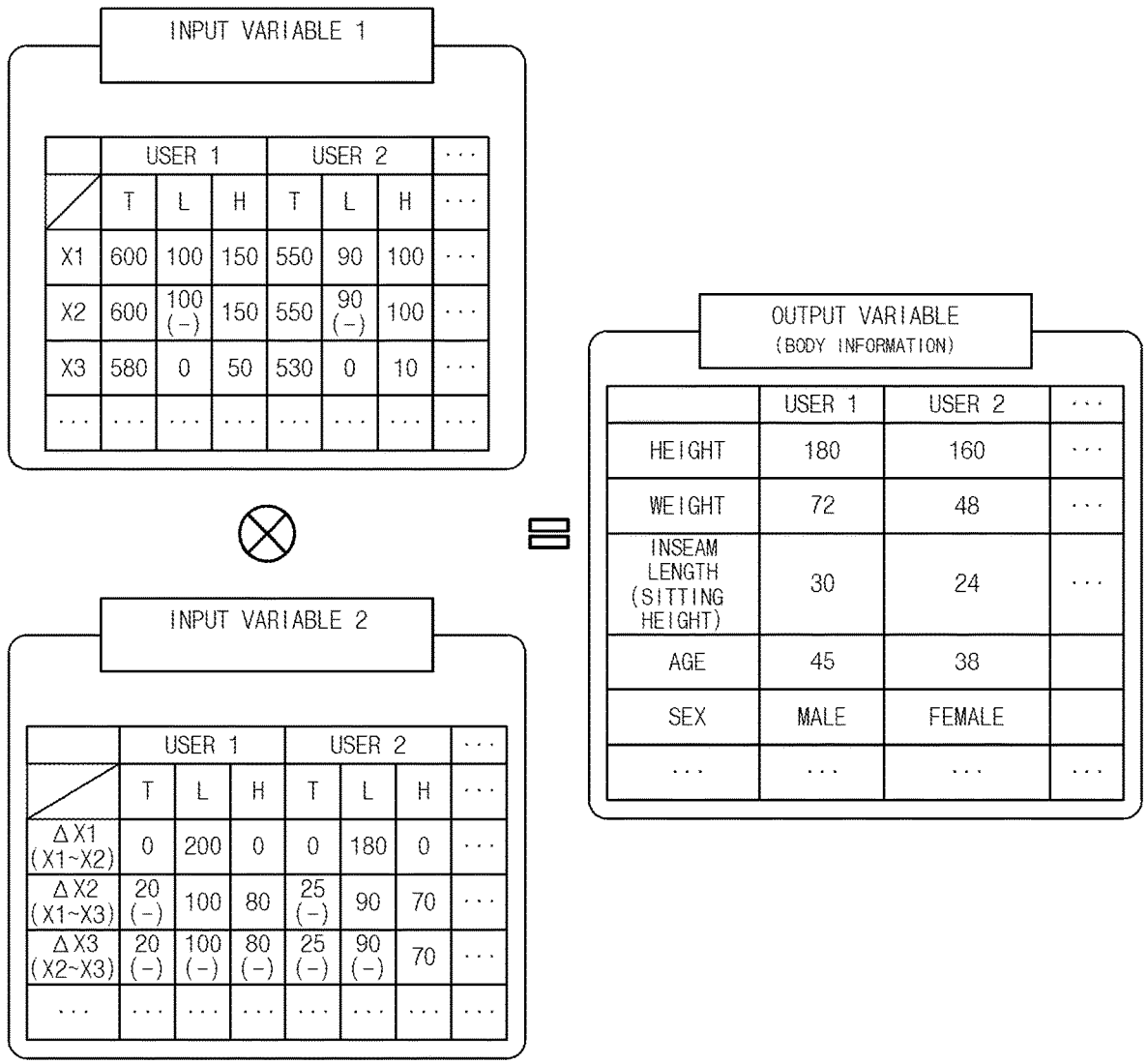
FIG. 4 is a diagram for illustrating a process of estimating body information according to some forms of the present disclosure.

FIG. 4 is a diagram for illustrating a process of estimating body information according to forms of the present disclosure.

Referring to FIG. 4, the processor 170 may recognize an absolute coordinate of each body part by analyzing the user image acquired by the image sensor 110. For example, the processor 170 may recognize absolute coordinates of a left eye X1, a right eye X2, and a nose X3 based on the image sensor 110. In other words, the processor 170 may calculate a distance from the image sensor 110 to each body part.

In addition, the processor 170 may calculate a correlation distance relationship between the body parts using the absolute coordinate of each body part. For example, the processor 170 may calculate a distance ΔX1 between the left eye X1 and the right eye X2, a distance ΔX2 between the right eye X2 and the nose X3, and a distance ΔX3 between the nose X3 and the left eye X1.

The processor 170 may estimate the body information, that is, the height, the weight, the leg length, and the like using the absolute coordinate of each body part and the correlation (the relative coordinate) between the body parts.

Figure 5:
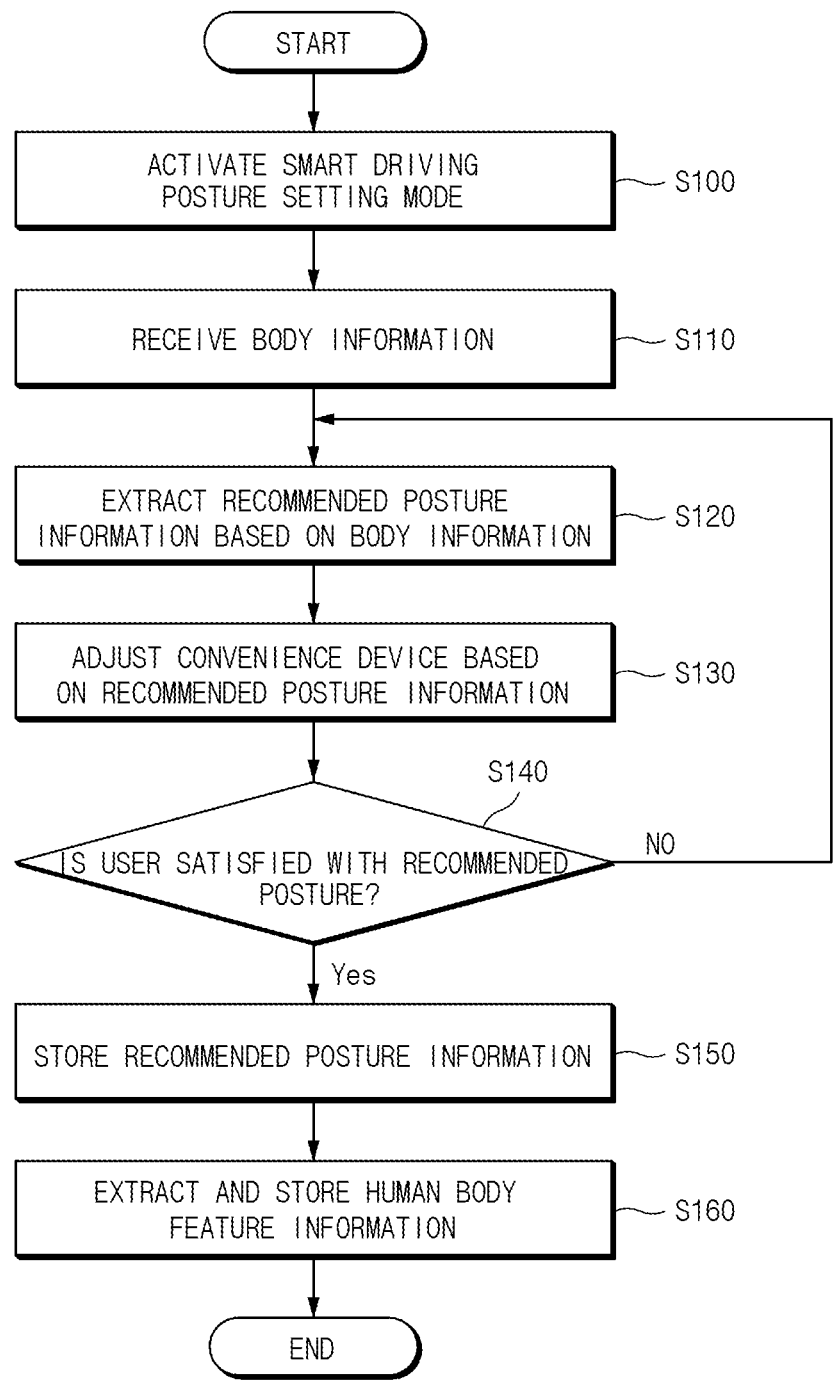
FIG. 5 is a flowchart illustrating a smart driving posture control method according to another form of the present disclosure.

FIG. 5 is a flowchart illustrating a smart driving posture control method according to an exemplary form of the present disclosure. In the present form, the case in which the user uses the smart driving posture control for the first time will be described as an example.

The processor 170 may activate the smart driving posture setting mode when the preset specific event occurs (S100). The processor 170 may activate the smart driving posture setting mode when the manipulation of the button to which the smart driving posture setting function is assigned in the input device 120 is detected.

The processor 170 may receive the body information through the input device 120 after activating the smart driving posture setting mode (S110). The processor 170 may output the smart driving posture setting screen on the output device 130. The processor 170 may receive the body information input by the user on the smart driving posture setting screen.

The processor 170 may extract the recommended posture information matching the body information (S120). The processor 170 may recommend the driving posture suitable for the user based on the body information using the general-purpose artificial intelligence inference engine. In other words, the processor 170 may determine the seat position, the steering wheel position, the mirror position, and/or the HUD position based on the body information.

The processor 170 may control the driving posture by adjusting the convenience device 150 based on the recommended posture information (S130). The processor 170 may transmit the recommended posture information to the convenience device 150, and the convenience device 150 may adjust the positions of the seat, the steering wheel, the mirror, and/or the HUD based on the recommended posture information.

The processor 170 may determine whether the user is satisfied with the recommended posture (S140). The processor 170 may determine whether the user is satisfied with the recommended posture by determining whether the user arbitrarily adjusts the driving posture after the driving posture control. When the user arbitrarily adjusts the driving posture, the processor 170 may determine that the user is dissatisfied with the recommended posture. The processor 170 may determine that the user is satisfied with the recommended posture when the user does not arbitrarily adjust the driving posture.

When the user is satisfied with the recommended posture, the processor 170 may store the corresponding recommended posture information in the memory 140 (S150). The processor 170 may match the recommended posture information with the body information input in advance and store the matched recommended posture information.

The processor 170 may extract and store the human body feature information of the user using the image sensor 110 (S160). The processor 170 may acquire the user image through the image sensor 110. The processor 170 may extract the human body feature information from the user image through the image analysis. The human body feature information may include at least one of the appearance information and/or the position information of each body part. The processor 170 may match the human body feature information with the body information and the recommended posture information and store the matched human body feature information in the memory 140. The processor 170 may transmit the body information, the recommended posture information (the set driving posture information), and the human body feature information to the server 200.

When the user is dissatisfied with the recommended posture in S140, the processor 170 may return to S120 and re-extract the recommended posture information based on the body information. Alternatively, when the driving posture is arbitrarily adjusted by the user, the processor 170 may extract and store the adjusted driving posture information. In addition, the processor 170 may store the extracted driving posture information in the memory 140 together with the body information. In this connection, the processor 170 may extract and store the human body feature information of the user through the image sensor 110.

Figure 6:
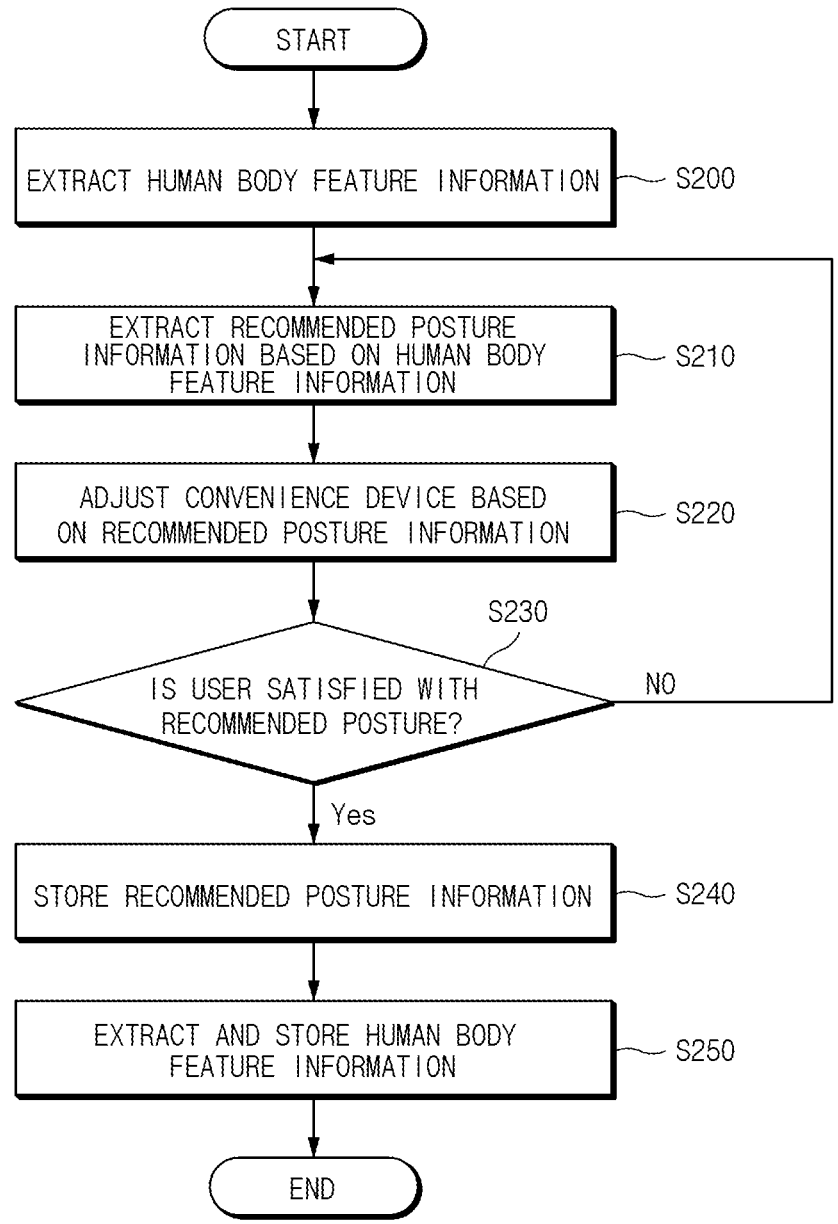
FIG. 6 is a flowchart illustrating a smart driving posture control method according to another form of the present disclosure.

FIG. 6 is a flowchart illustrating a smart driving posture control method according to another form of the present disclosure. In the present form, the case in which the user reuses the smart driving posture control will be described as an example.

The processor 170 may extract the human body feature information of the user using the image sensor 110 when the user boards the vehicle (S200). The processor 170 may extract at least one of the appearance information and/or the position information of each body part of the user from the user image acquired by the image sensor 110 through the image analysis.

The processor 170 may extract the recommended posture information based on the human body feature information (S210). The processor 170 may estimate the body information of the user based on the human body feature information. The processor 170 may extract the recommended posture information based on the estimated body information using the personalized artificial intelligence inference engine. In other words, the processor 170 may calculate the recommended posture information using the estimated body information as an input variable of the polynomial regression equation.

The processor 170 may adjust the convenience device 150 based on the recommended posture information (S220). The processor 170 may transmit the recommended posture information to the convenience device 150, and the convenience device 150 may control the driving posture of the user by adjusting the positions of the seat, the steering wheel, the mirror, and/or the HUD based on the recommended posture information.

The processor 170 may determine whether the user is satisfied with the recommended posture (S230). When there is the arbitrary adjustment of the driving posture by the user after adjusting the convenience device 150 based on the recommended posture information, the processor 170 may determine that the user is dissatisfied with the recommended posture. On the other hand, when there is no arbitrary adjustment of the driving posture by the user after adjusting the convenience device 150 based on the recommended posture information, the processor 170 may determine that the user is satisfied with the recommended posture.

When the user is satisfied with the recommended posture, the processor 170 may store the corresponding recommended posture information in the memory 140 (S240). The processor 170 may store the recommended posture information (the driving posture information) in the memory 140 together with the estimated body information.

The processor 170 may extract and store the human body feature information of the user using the image sensor 110 (S250). The processor 170 may extract the appearance information and/or the position information of each body part of the user from the user image acquired by the image sensor 110. The processor 170 may match the human body feature information with the estimated body information and the recommended posture information and store the matched human body feature information in the memory 140. In addition, the processor 170 may transmit the body information, the recommended posture information, and the human body feature information to the server 200.

The smart driving posture control system 100 according to the forms described above may store the body information of the user that does not violate the personal information protection act in the big data-based server 200, and provide, to the vehicle, a standardized (generalized) general-purpose service utilizing a result of general-purpose artificial intelligence inference extracted from big data. When providing the general-purpose service, actual usage information (the driving posture information) of the user may be acquired and stored in the server 200. The big data results thus stored are an evolved learning-type artificial intelligence system that provides reprocessed services similar to personalized services of individuals through a clustering process, which is a personalization classification standard. The evolved learning-type artificial intelligence system may automatically detect and classify body structured data, when the user stores body input information that is applied for the first time, store the body input information together with minimum passenger detection/classification information of the user, and when the corresponding user boards the same type of vehicle or another type of vehicle connected to the server 200 in the future, automatically detect the corresponding passenger to provide the personalized service.

Figure 7:
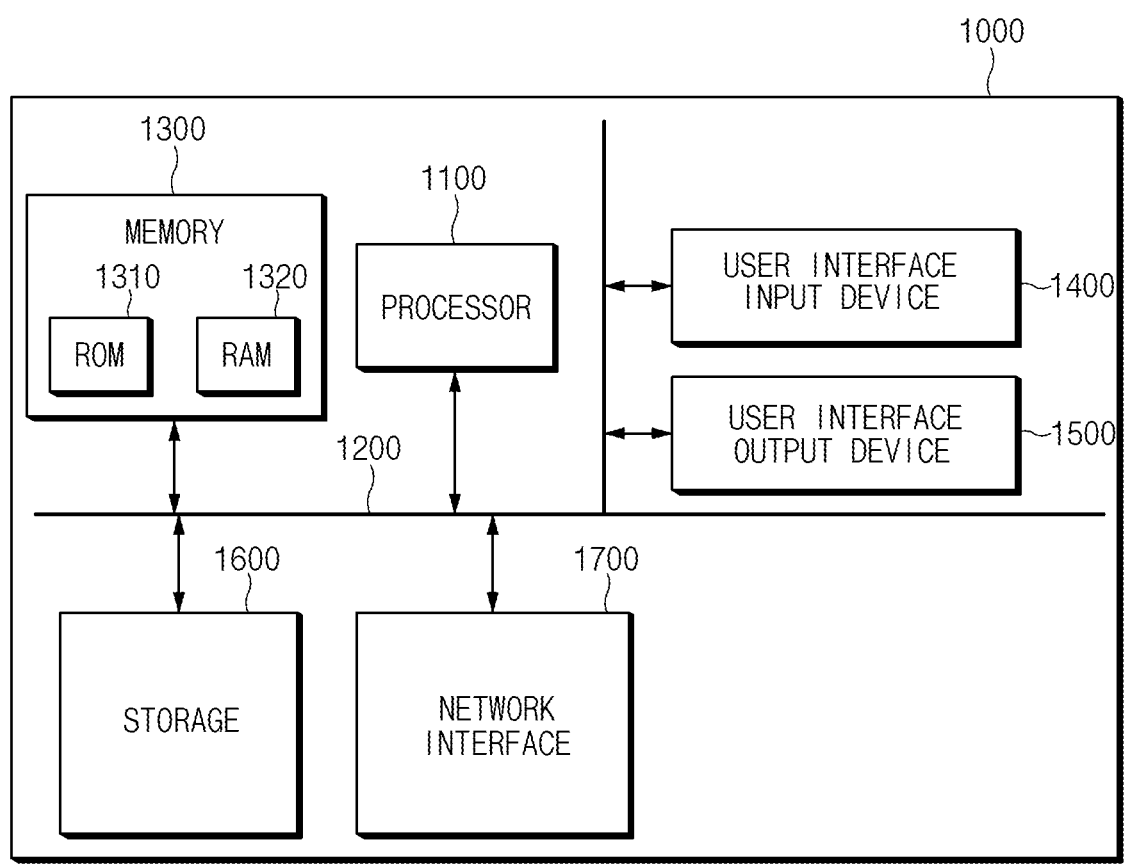
FIG. 7 is a block diagram illustrating a computing system that executes a smart driving posture control method according to some forms of the present disclosure.

FIG. 7 is a block diagram illustrating a computing system for executing a smart driving posture control method according to some forms of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The description above is merely illustrative of the technical idea of the present disclosure, and various modifications and changes may be made by those skilled in the art without departing from the essential characteristics of the present disclosure. Therefore, the forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

According to the present disclosure, the feature information of the user may be extracted using the image sensor without the input of the body information (a physique) of the user, and the user may be recognized based on the extracted feature information, so that the driving posture suitable for the body type of the user may be recommended.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A smart driving posture control system comprising:
an image sensor installed in a vehicle;
a non-transitory memory for storing instructions executable to process a driving posture control; and
a processor connected to the image sensor and configured to execute the instructions to:
  recognize a user boarding the vehicle through the image sensor and extract human body feature information of the user, wherein the human body feature information includes an absolute coordinate of each body part of the user;
  calculate a correlation between the body parts using the absolute coordinate of each body part;
  estimate body information of the user based on the absolute coordinate of each body part and the correlation between the body parts;
  extract recommended posture information based on the estimated body information; and
  control a convenience device based on the recommended posture information to adjust a driving posture of the user,
wherein the recommended posture information is a driving posture recommended to the user based on the estimated body information.

2. The smart driving posture control system of claim 1, wherein the processor is configured to:
extract the recommended posture information matching the estimated body information using a statistical prediction model stored in the non-transitory memory.

3. The smart driving posture control system of claim 1, wherein the processor is configured to:
when the user uses a smart driving posture control function for the first time,
receive body information input by the user;
extract the recommended posture information based on the body information; and
control the convenience device based on the recommended posture information to adjust the driving posture.

4. The smart driving posture control system of claim 3, wherein the body information includes at least one of a sex, an age, a height, a weight, or a leg length of the user.

5. The smart driving posture control system of claim 1, wherein the processor is configured to store adjusted driving posture information in the non-transitory memory when the user is satisfied with the adjusted driving posture.

6. The smart driving posture control system of claim 5, wherein the processor is configured to store the extracted human body feature information together with the driving posture information and body information in the non-transitory memory.

7. The smart driving posture control system of claim 1, wherein the processor is configured to:
when the user is dissatisfied with the adjusted driving posture,
control the convenience device based on arbitrary adjustment of the user to adjust the driving posture; and
store the adjusted driving posture together with the extracted human body feature information and body information of the user.

8. The smart driving posture control system of claim 1, wherein the extracted human body feature information includes at least one of appearance information or position information of each body part of the user.

9. The smart driving posture control system of claim 8, wherein the appearance information includes at least one of a wrinkle, a skin color, an eye size, a face size, or a body shape of the user,
wherein the position information of each body part of the user includes the absolute coordinate of each body part or a relative coordinate between body parts of the user.

10. The smart driving posture control system of claim 1, wherein the convenience device includes at least one of a seat device, a steering wheel device, a mirror device, or a head-up display (HUD) device.

11. A smart driving posture control method, the method comprising:
recognizing, by a sensor, a user boarding a vehicle and obtaining human body feature information of the user, wherein the human body feature information includes an absolute coordinate of each body part of the user;
calculating, by a processor, a correlation between the body parts using the absolute coordinate of each body part
estimating, by the processor, body information of the user based on the absolute coordinate of each body part and the correlation between the body parts;
extracting, by the processor, recommended posture information based on the human estimated body information; and
controlling, by the processor, a convenience device based on the recommended posture information to adjust a driving posture of the user,
wherein the recommended posture information is a driving posture recommended to the user based on the estimated body information.

12. The method of claim 11, wherein the extracting of the recommended posture information includes:
extracting, by the processor, the recommended posture information matching the estimated body information using a statistical prediction model stored in a memory.

13. The method of claim 11, further comprising:
receiving, by the processor, body information input by the user when the user uses a smart driving posture control function for the first time; and
extracting, by the processor, the recommended posture information based on the body information.

14. The method of claim 13, wherein the body information includes at least one of a sex, an age, a height, a weight, or a leg length of the user; and
wherein the leg length includes all statistics obtained by calculating a length of an inseam of pants or a numeric value selected by the user in relation to the height.

15. The method of claim 11, further comprising:
storing adjusted driving posture information in a memory when the user is satisfied with the adjusted driving posture.

16. The method of claim 15, further comprising:
storing the obtained human body feature information in the memory.

17. The method of claim 11, further comprising:
when the user is dissatisfied with the adjusted driving posture,
controlling, by the processor, the convenience device based on arbitrary adjustment of the user to adjust the driving posture; and
storing in a memory the adjusted driving posture together with the extracted human body feature information and body information of the user.

18. The method of claim 11, wherein the extracted human body feature information includes at least one of appearance information or position information of each body part of the user.

19. The method of claim 18, wherein the appearance information includes at least one of a wrinkle, a skin color, an eye size, a face size, or a body shape of the user,
wherein the position information of each body part of the user includes at least one of the absolute coordinate of each body part or a relative coordinate between body parts.

20. The method of claim 11, wherein the convenience device includes at least one of a seat device, a steering wheel device, a mirror device, or a head-up display (HUD) device.

* * * * *

UNITED STATES PATENT AND TRADEMARK OFFICE
CERTIFICATE OF CORRECTION

| | | |
|---|---|---|
| PATENT NO. | : 11,842,550 B2 | Page 1 of 1 |
| APPLICATION NO. | : 17/464065 | |
| DATED | : December 12, 2023 | |
| INVENTOR(S) | : Seong Gyu Kang et al. | |

It is certified that error appears in the above-identified patent and that said Letters Patent is hereby corrected as shown below:

In the Claims

Claim 11, Column 14, Line 2 "human" should be deleted

Signed and Sealed this
Thirtieth Day of January, 2024

*Katherine Kelly Vidal*

Katherine Kelly Vidal
*Director of the United States Patent and Trademark Office*